Sept. 23, 1958     A. J. STOCK     2,853,178
DRIBBLE RETURN FOR UNDERBUNKER CONVEYOR
Filed Feb. 2, 1954     4 Sheets-Sheet 1

INVENTOR
*Arthur J. Stock*

BY *Stevens, Davis, Miller and Mosher*
ATTORNEYS

Sept. 23, 1958  A. J. STOCK  2,853,178
DRIBBLE RETURN FOR UNDERBUNKER CONVEYOR
Filed Feb. 2, 1954  4 Sheets-Sheet 2

INVENTOR
Arthur J. Stock
BY Stevens, Davis, Miller & Mosher
ATTORNEYS

Sept. 23, 1958　　　　　A. J. STOCK　　　　　2,853,178
DRIBBLE RETURN FOR UNDERBUNKER CONVEYOR
Filed Feb. 2, 1954　　　　　　　　　　　　　　4 Sheets-Sheet 3

INVENTOR
Arthur J. Stock
BY Stevens, Davis, Miller and Mosher
ATTORNEYS

Sept. 23, 1958
A. J. STOCK
2,853,178
DRIBBLE RETURN FOR UNDERBUNKER CONVEYOR
Filed Feb. 2, 1954
4 Sheets-Sheet 4

INVENTOR
Arthur J. Stock
BY Stevens, Davis, Miller and Mosher
ATTORNEYS

United States Patent Office 2,853,178
Patented Sept. 23, 1958

2,853,178

DRIBBLE RETURN FOR UNDERBUNKER CONVEYOR

Arthur James Stock, Rocky River, Ohio

Application February 2, 1954, Serial No. 407,674

4 Claims. (Cl. 198—85)

This invention relates to a dribble return for a conveyor and more particularly to a return for the underbunker conveyor of a coal handling system.

The system of coal handling to which this invention generally pertains includes a series of aligned bunkers, a conveyor running in registry with the outlets of the bunkers, coal scales and coal valves positioned at spaced points to receive the coal from the conveyor, and pulverizers or stokers which receive the coal from the scales and ultimately pass it on to a furnace is one that is familiar to the art. In the operation of the system, however, it has been found that a portion of the coal handled by the conveyor is not passed from the bunker to the coal valves and coal scales. This portion constitutes approximately ½ to 3% of the coal handled. The apparent reason that this coal does not pass to the coal valves and coal scales can best be explained by saying that it sticks to the underbunker conveyor chain due to moisture or mechanical reasons and does not become separated therefrom until the underbunker conveyor chain is bent, which usually occurs when the conveyor passes over a pulley or sprocket. Material of this character is known as dribble material in the art. It will be appreciated that although dribble material has been spoken of with reference to a coal handling system, such reference is by no means restrictive and that a better appreciation of this invention will be gained, if the concepts stressed are considered directed to a conveyor handling a material without regard to the specific material handled. The unique reference to coal in the preceding remarks, as will appear in the subsequent remarks, serves a dual function. Firstly, such reference enables a discussion of the invention along concrete lines and thereby enables a fuller understanding of the thoughts expressed and secondly, the invention is of particular utility when practiced with a coal handling system. For example, the dribble-return system of the present invention might be employed in a conveyor distribution system of the type described in United States Patent No. 2,626,719 granted to Arthur J. Stock.

Heretofore in the art, dribble material was collected in a bunker or hopper located at some point such as below the head end sprocket of the underbunker conveyor of the coal handling system. Periodically or whenever the hopper became filled to a predetermined level, the collected dribble or coal was removed, usually by hand.

Underbunker conveyors are usually installed with automatic control. Under certain conditions of operation, when the operator changes from one point of outlet to another point of outlet, there is a full load on the conveyor chain which is not discharged before the end of the conveyor. This coal is known in the art as a "slug." These slugs accumulate at the end of the conveyor, and inasmuch as they represent a fair amount of coal, the accumulation can be quite rapid. Unless removed frequently, the conveyor housing plugs with coal and thus causes jamming of the chain on the head sprocket. This jamming may either stall the conveyor driving means or break the chain.

It is the primary object of the present invention to eliminate manual handling of dribble and slugs by providing a fully automatic means for collecting dribble and slug material freed from a conveyor or conveyor chain, such as the underbunker conveyor and returning collected dribble and slug material to an appropriate place on the conveyor, as for example, the top run of the conveyor in the case of the underbunker conveyor.

To accomplish the ends of the present invention apparatus constituting a dribble and slug return, consisting essential of a horizontal screw conveyor and a gravity discharge conveyor elevator, is employed. One arrangement of the apparatus is such, with respect to the conveyor treated, that most of the fine material which for some reason was not passed on by the conveyor drops directly into the gravity discharge conveyor elevator at a specific spot in the conveyor's run. The small amount of material carried past this spot is freed from the conveyor chain by some suitable arrangement and dropped into the screw conveyor. The particular arrangement used to free this material may take any form and may in fact be inherent in the operation of the conveyor. Thus, with an underbunker conveyor no extra equipment is necessary as the conveyor, while passing over the head end sprocket, will be sufficiently flexed to free this material. Due to the cooperation between the two components of the system, the screw conveyor transfers whatever fine material it receives to the gravity discharge conveyor elevator which in turn carries it and discharges it onto an appropriate place on the conveyor, as for example, the top strand of the underbunker conveyor.

The foregoing paragraph describes the general operation of one form of the present invention when installed primarily to take care of the return of the dribble material from the lower strand of the conveyor to the top strand. If the dribble return system (terminology used to include return of slugs as well) is also used to return slugs to the top strand of the conveyor, then a preferred form of the invention will consist in providing a bottom plate under the lower strand of the conveyor to cause all material to be deposited into the screw conveyor unit and from there returned by means of the gravity discharge conveyor elevator to the top strand of the unit. Because of the design of the underbunker conveyor itself, the top strand of the conveyor cannot carry coal quite as fast as the lower strand may bring a slug into the dribble return system. For this reason, the slug is not discharged directly into the gravity discharge unit, but, rather, discharged into the space above the screw conveyor. The capacity of this screw conveyor can then be regulated so that the following gravity discharge conveyor elevator and the top strand of the underbunker conveyor will not be overloaded.

It is another object of the present invention to provide an apparatus for collecting the dribble coal and/or slugs from underneath the head end sprocket of an underbunker conveyor and returning it to the top strand of the conveyor that will not require substantial vertical head room above the conveyor. The problem of head room at this point is already a critical one in most coal handling installations (power plants). To compound the difficulties and increase the cost of adapting existing apparatus to a new improvement by requiring additional head room would not be a solution, but the creation of a larger problem. The underbunker conveyor in most installations is located closely beneath the bunker. The main reason for this arrangement is to cut down on head room and thereby conserve in building costs since the building which must house the equipment need not be made as high as if the case were otherwise. A further reason why the conveyor is put close to the bunker bottom is that the stress caused by the conveyor pull is transmitted to the bunker shell in some designs. If this stress were to occur several feet below the bunker, great care would have to be taken to make the installation structurally strong enough. It is, therefore, most desirable to locate the conveyor closely beneath the bunker.

In order to provide a dribble and slug return system for such installations, the apparatus employed must fit into a space not to exceed approximately 12 to 24 inches in height, the vertical distance from the bottom side of the top strand of the conveyor to the top of the apparatus. It is apparent from the foregoing that a successful design for a dribble return must be one that will fit in the very limited space present between the conveyor and the bottom of the bunker. The present invention, for the first time, provides a design that will meet the requirements of the art by supplying an apparatus that fits in this limited space.

Other objects and advantages of the present invention will become apparent from a detailed consideration of the following description when taken in conjunction with the drawings in which.

Figure 1:
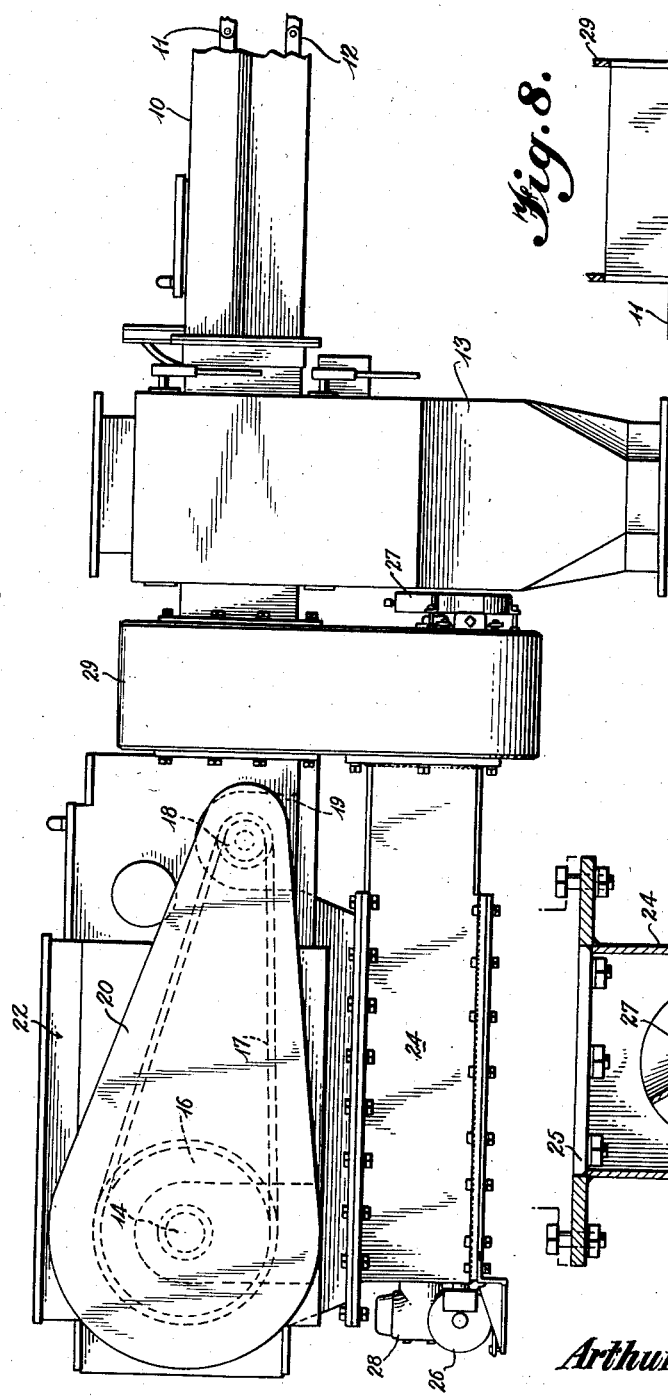
Figure 1 is a view in side elevation of the head end of an underbunker conveyor showing the dribble return apparatus.
Figure 4:
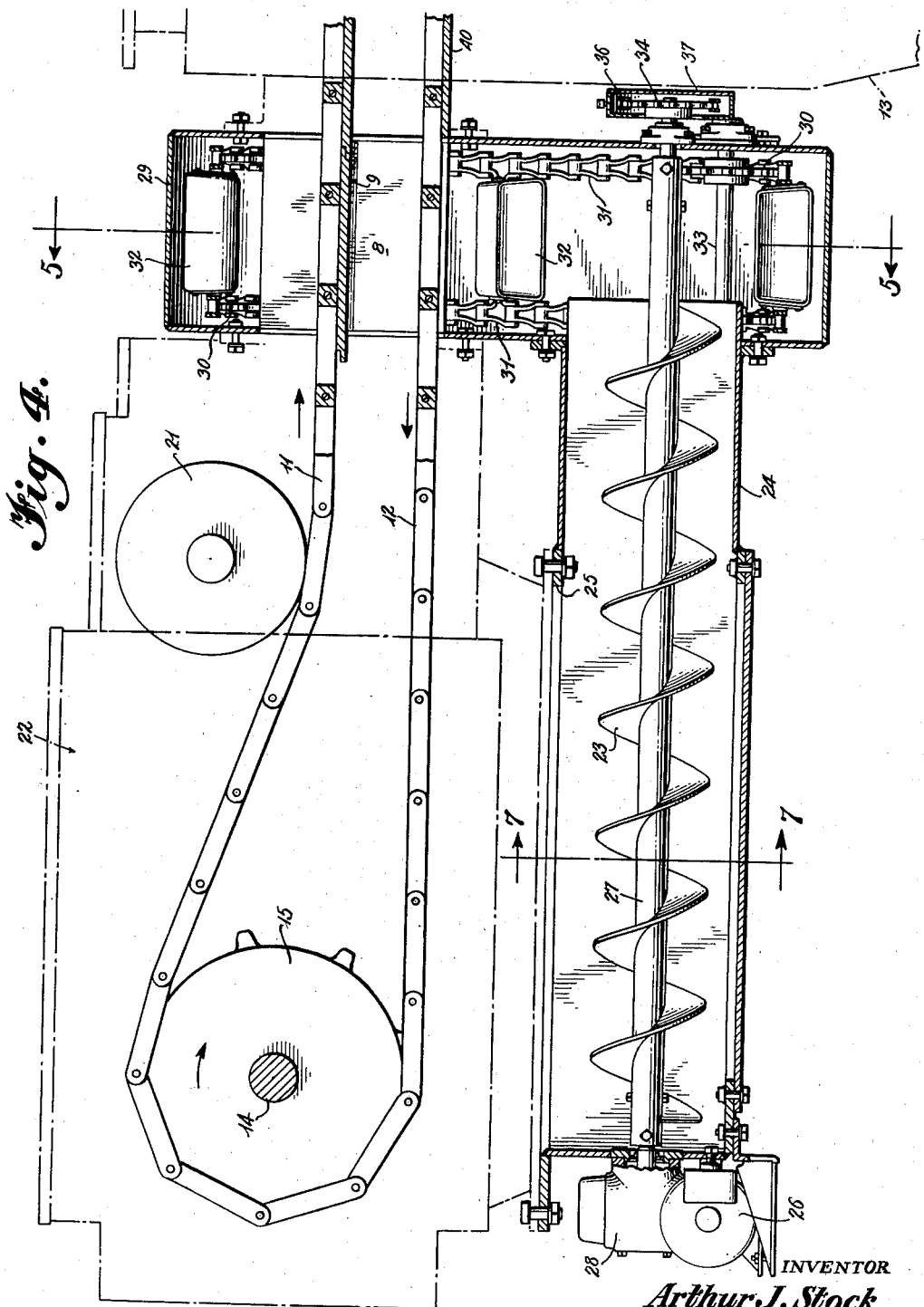
Figure 4 is a view in vertical section taken along the elongated axis of the underbunker conveyor.

Referring now to the drawings, it will be seen that an underbunker conveyor, designated generally by the numeral 10, is provided with a drag-scraper type of conveyor chain consisting of a top run 11 and a bottom run 12. In the usual operation of the conveyor, coal from a bunker (not shown) is discharged, normally by gravity, onto the top run 11 of the conveyor which travels to the right as shown in Figure 1. As shown in Figure 4, the top run 11 of the conveyor travels to the right over a dividing partition 9 in the conveyor housing 8, and the bottom run 12 of the conveyor will travel to the left over the bottom plate 40 of the conveyor housing. However, although not shown in the drawings, the dividing partition 9 will terminate short of the right-hand end of the conveyor in a conventional manner so that, at the end of the top run, the coal is dropped through the top run 11 to the bottom run 12 of the conveyor where it is conveyed to the left. At predetermined locations coal is passed through conventional openings (not shown) in the bottom plate 40 to points of use via coal valves. This apparatus is indicated by the numeral 13 in the drawings and, as shown, the inlet to the coal scale or other chute to pulverizer or stoker connects directly to the outlet of valve 13. The inlet (upper end) of the valve 13 may be used to supply coal to the conveyor from a bunker (not shown) in a conventional manner, or coal may be supplied to said conveyor through a plurality of inlets similar to that of valve 13 in a conventional manner as shown, for example, in Figure 11 of U. S. Patent No. 2,626,719 referred to above.

The head end of the conveyor 10 is seen at the left side of Figure 1 and consists of a central shaft 14 upon which is mounted a pair of sprocket wheels 15 and a V-belt sheave 16. By means of a mechanical connection, V-belt 17, sheave 16 is driven by a V-belt pulley 18 mounted on the output shaft of the main drive motor 19 for the conveyor. A protective guard 20 is provided to enclose the drive of the head end of the conveyor. Usually a gear type of speed reducer is placed between V-belt sprocket 16 and conveyor chain sprocket 15. The conveyor, as shown in the drawings, is of the drag-scraper type and, therefore, is provided with a single wide, endless chain. In some cases a pair of endless chains is used, one being located on each side of drag-scraper bars which constitute the conveying means. The two chains are connected to the bars and themselves engage the sprocket wheels 15 and are thereby driven. This type of conveyor is known as a bar flight conveyor. In the case of a single chain design, a wide sprocket 15 is employed, as will be appreciated. For purposes of simplicity, details of the conveyor structure have been omitted since they are well understood and appreciated in the art. A wheel 21, suitably mounted for free rotation, bears against the top run of the conveyor serving to reduce the head room requirements of the portion of the conveyor which lies beneath the bunkers. The head end of the conveyor is enclosed within a housing which is generally designated by the numeral 22. The details of this housing are conventional in all respects and form no particular part of the present invention.

The apparatus constituting the dribble return includes a screw conveyor 23 located in a housing 24. An inlet 25 connected to housing 24 is in registry with an outlet at the bottom of the housing 22. The axis of screw conveyor 23 lies substantially parallel to the long axis of the underbunker conveyor and the inlet 25 to the housing 24 lies substantially beneath the head end sprockets 15 of the underbunker conveyor so that coal, which has adhered to the chains and bars of the conveyor due to moisture or mechanical reasons and which becomes freed by the chains being bent over the head end sprockets 15, will fall into the housing 24 and be conveyed by the screw 23 to the right, as shown in Figure 4. The screw conveyor is driven by a motor 26 which drives the shaft 27 of the conveyor 23 through a suitable gear reducer 28.

The housing 24 opens into and is joined to another housing 29 which contains a gravity discharge conveyor elevator. This apparatus consists of four pairs of sprockets 30 with each pair being located in one corner of the rectangular housing 29. A pair of endless chains 31, having buckets 32 connected therebetween, are mounted to be driven by the sprockets 30. With the arrangement shown, the apparatus will convey while traveling horizontally, elevate on the vertical, and discharge itself from the vertical run by gravity.

Figure 5:
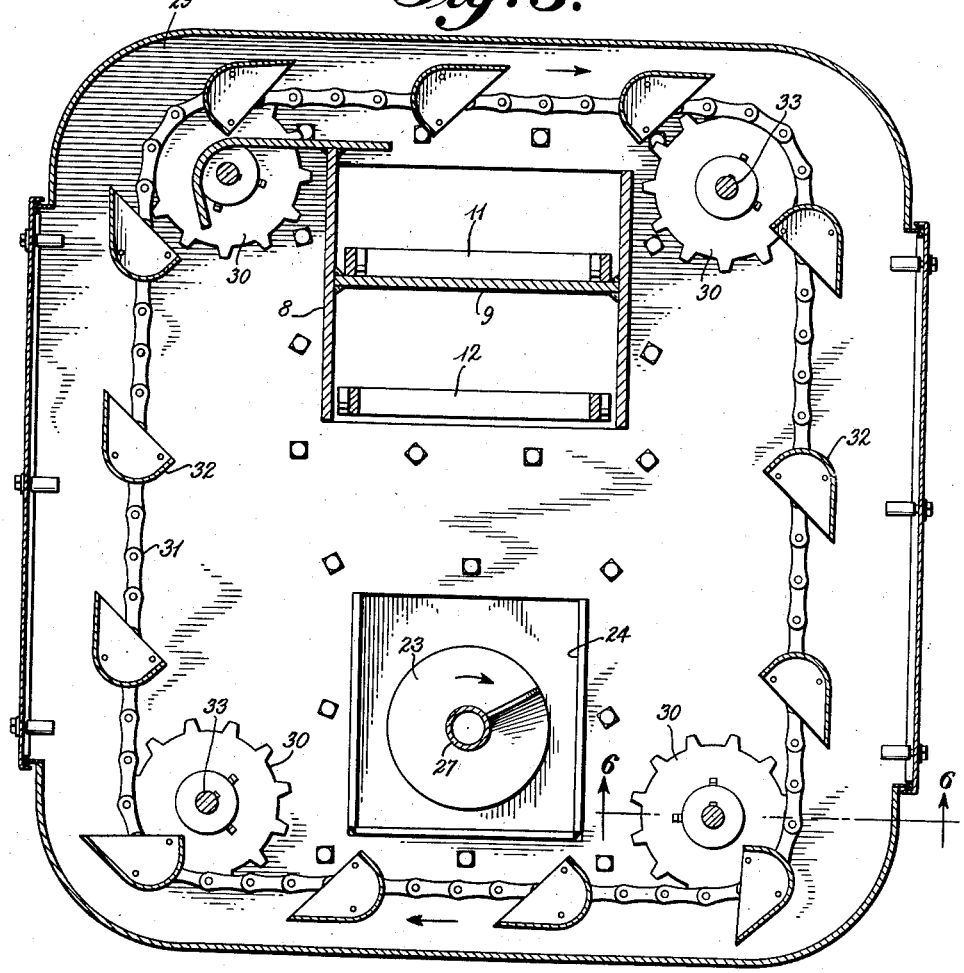
Figure 5 is a view in transverse section taken along line 5—5 of Figure 4.
Figure 6:
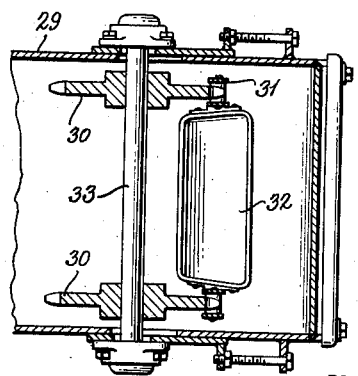
Figure 6 is a detailed section taken along line 6—6 of Figure 5.

As shown in Figure 5, the conveyor housing 8 is provided with a horizontal partition 9 centrally separating the housing 8 into two vertically spaced compartments. The top run 11 of the underbunker conveyor travels on the upper space, and the bottom run 12 travels in the lower space. The chains and scraper bar of the drag-scraper conveyor, while it is moving as the top run 11, rest on the dividing partition 9. When the scraper bars and chains are moving as the bottom run 12, they normally rest on the plate 40 constituting the bottom of the conveyor housing 8. This bottom plate of the housing 8, however, is interrupted within the housing 29. This enables any coal that is carried past the last valve 13 to be dropped directly into the traveling buckets 32 in the housing 29. As previously mentioned, the coal that passes the housing 29 will be carried over to the head end sprockets 15 where it will be released from the chains as they are bent over the sprockets. The freed coal will drop into the screw conveyor 23 and be conveyed to the housing 29 and hence to the buckets 32.

Figure 8:
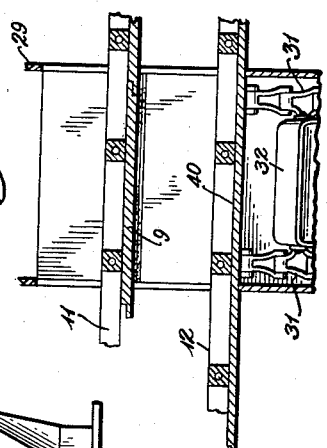
Figure 8 is a partial view of Figure 4 showing a modification thereof wherein the bottom of the conveyor casing extends through the conveyor elevator return housing.
Figure 7:
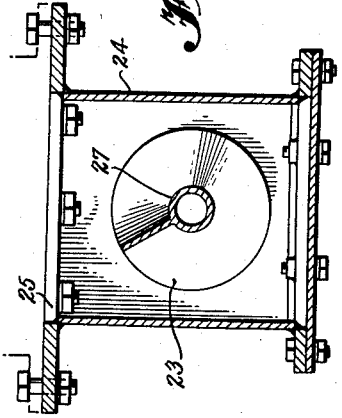
Figure 7 is a detailed section taken along line 7—7 of Figure 4.
Figure 2:
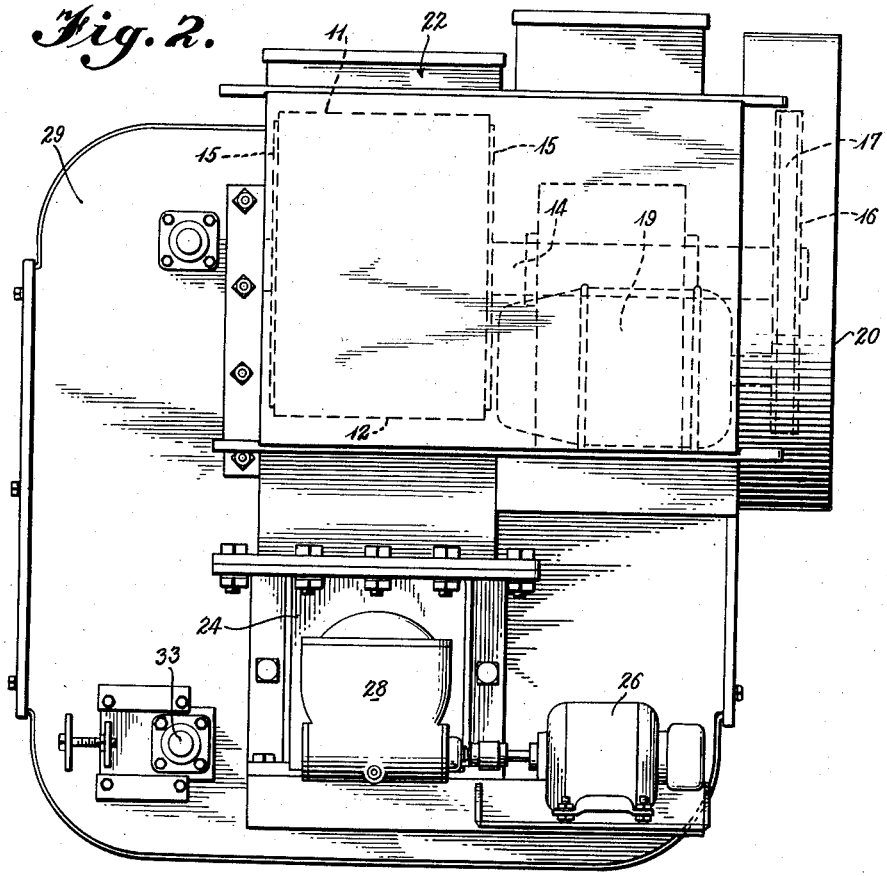
Figure 2 is a view in end elevation of the apparatus shown in Figure 1.
Figure 3:
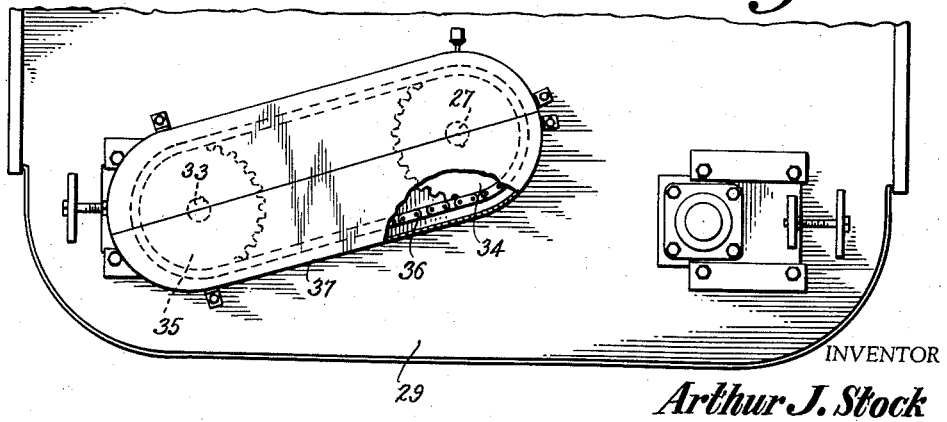
Figure 3 is a fragmentary view in end elevation of the apparatus shown in Figure 1 but taken on the opposite end with respect to Figure 2.

In the event that it is desired to use the screw feeder 23 itself for the purpose of returning slugs to the conveyor, then the bottom plate 40 of the housing 8 may be extended through housing 29 as shown in the modification of Figure 8 (instead of being interrupted within the housing 29 as shown normally in Figure 4), such that the slug will be conveyed to a point where it will fall directly onto the screw feeder instead of onto the lower strand of the gravity discharge elevator.

Each pair of sprockets 30 is keyed on a shaft 33 which is suitably bearing mounted to rotate freely. One pair of sprockets functions as the drive pair for the other pairs of sprockets. The power to drive the sprockets 30 is derived from the motor 26 via gear reducer 28, shaft 27 of the screw conveyor 23 and a suitable transmission between the shaft 27 and the shaft 33 of the drive pair of sprockets. This transmission, as shown, takes the form of a sprocket wheel 34 mounted on the end of shaft 27, a sprocket wheel 35 mounted to one end of the shaft 33 and an endless chain 36 connecting said two sprocket wheels. This transmission is enclosed within a guard identified by the numeral 37.

From the foregoing description of the figures of the drawings, many features of the present invention are evident. To portray other aspects of the inventive concepts disclosed herein, the following discussion of various changes and modifications may prove of benefit.

Throughout, it has been repeatedly said that the dribble material is returned to the conveyor at a point previous in the system or, so to speak, upstream of the material movement so that it is given another chance to be moved or directed properly. The precise point to which the dribble is returned is significant only in this respect and, hence, returning the dribble material to the bunker by means of this apparatus is not precluded.

It is possible when handling dribble material only to eliminate the screw conveyor by placing the lower horizontal run of the gravity discharge conveyor elevator in housing 29 at a lower elevation. This would allow a chute to extend from underneath the head sprocket down to the lower strand of the bucket elevator. In this arrangement, however, the elimination of the screw conveyor is made possible by the substitution of the chute.

As is evident from the previous description, the gravity discharge run around conveyor elevator employs four sets of sprockets, one set at each of the four corners. It will undoubtedly be appreciated that a pair of large diameter sprockets mounted on a single shaft can be located at the lower end in place of the two sets of smaller sprockets and similarly a pair of large diameter sprockets mounted on a single shaft can be located at the upper end in place of the two sets of smaller sprockets as shown. It is also possible to make use of this variation in design by combining it with the original design whereby a pair of large sprockets can be used at the lower end and two pairs of small sprockets at the upper end or vice versa. It is also possible to provide fixed guides for the chain instead of some of the sprockets.

If a pair of large sprockets is used at the lower end, it would be necessary to run the coal through the sprocket located on the screw conveyor side. This can be accomplished by attaching the spokes of the sprocket to the outer edges of the screw conveyor. By utilizing the arrangement having a pair of large sprockets at the bottom end and two pairs of smaller sprockets at the top, it is possible to fit the equipment into the same amount of head room as the original design.

In place of using two chains with buckets between them and four pairs of sprockets, it is also possible to build a wheel consisting of two rings with buckets permanently fixed between the rings. In such an arrangement, the wheel is carried between a suitable roller system, as for example, three pairs of rollers appropriately spaced about the rings. The drive for the wheel is attained by any means capable of functioning to the desired end, as for example, by providing one of the rings with an internal gear and engaging same with a gear mounted on shaft 27 of the screw conveyor 23 or an extension thereof.

Although the present invention has been shown and described with reference to specific embodiments, it will be appreciated that various changes and modifications of the embodiments disclosed which are obvious to persons skilled in the art are within the spirit, scope and contemplation of the present invention.

I claim:

1. In a material handling system including an endless conveyor of the drag-scraper type driven by a pair of horizontally spaced sprockets, said conveyor having a top run and a bottom run resting on top and bottom plates, respectively, between said sprockets, means for supplying solid and sub-divided material to at least one position along said top run, means for transferring said material from the end of said top run to the adjacent portion of said bottom run, and means including at least one opening in said bottom run for providing at least one discharge for material from said bottom run, wherein fine particles of said material tend to adhere to said conveyor and to be dislodged therefrom only when said conveyor passes around one of said sprockets subsequent to the passage of said conveyor beyond the last discharge opening, the improvement which comprises a material return system including a dribble-return housing located directly below said one sprocket and in open communication therewith so as to receive fine particles of material from said conveyor as said conveyor is bent in traveling around said sprocket, an elevating means connecting with said housing for lifting material deposited in said housing upwardly and onto the top run of said conveyor, and means within said housing for moving the material deposited therein onto said elevating means.

2. In a material handling system including an endless conveyor of the drag-scraper type driven by a pair of horizontally spaced sprockets, said conveyor having upper and lower runs resting on upper and lower flat plates, respectively, wherein material is supplied to at least one position along the upper run thereof and wherein material is transferred from said upper run to said lower run through an opening in said upper plate adjacent one of said sprockets, and wherein material is discharged from at least one position along said lower run through at least one opening therein, the improvement which comprises a dribble-return housing positioned directly below the other of said sprockets and being in open communication therewith, an elevator housing connecting with said dribble-return housing and surrounding said drag-scraper conveyor, a screw conveyor rotatably mounted in said dribble-return housing for feeding material deposited therein to said elevator housing, and a scoop-type elevator mounted within said elevator housing for removing material deposited therein and lifting said material onto the upper run of said drag-scraper conveyor.

3. In a material handling system including an endless conveyor of the drag-scraper type passing around and driven by a pair of horizontally spaced sprockets, said conveyor having a top run and a bottom run resting on top and bottom plates respectively, means for supplying solid particulate material to at least one position along said top run, means for transferring said material from the end of said top run through an opening in said top plate to the adjacent portion of said bottom run, and means providing at least one discharge opening for material from said bottom run, wherein fine particles of said material tend to adhere to said conveyor and to be dislodged therefrom only when said conveyor passes around one of said sprockets subsequent to the passage of said conveyor beyond said discharge opening, the improvement which comprises a material return system including a first housing located directly below said one sprocket and an open communication therewith so as to receive fine particles of material from said conveyor as said conveyor is bent in traveling around said sprocket, a second housing communicating with said first housing and surrounding said drag-scraper conveyor, a screw conveyor mounted in said first housing for transferring material deposited therein to said second housing, and an elevating means mounted within said second housing for lifting material deposited in said second housing upwardly and onto the top run of said conveyor.

4. In a material handling system including an endless conveyor of the drag-scraper type driven by a pair of horizontally spaced sprockets, said conveyor having upper and lower runs resting on upper and lower flat plates, respectively, wherein material is supplied to at least one position along the upper run thereof and wherein material is transferred from said upper run to said lower run through an opening in said upper plate adjacent one of said sprockets, and wherein material is discharged from at least one position along said lower run through at least one opening therein, the improvement which comprises a dribble-return housing positioned directly below the other of said sprockets and being in open communication therewith, an elevator housing connecting with said dribble-return housing and surrounding said drag-scraper conveyor, a screw conveyor rotatably mounted in said dribble-return housing for feeding material deposited therein to said elevator housing, and a scoop-type elevator mounted within said elevator housing for removing material deposited therein and lifting said material onto the upper run of said drag-scraper conveyor, said lower plate having an opening therein directly over said second housing so as to permit material to fall directly from said bottom run into said second housing.

References Cited in the file of this patent

UNITED STATES PATENTS

| | | |
|---|---|---|
| 329,498 | Spitzer | Nov. 3, 1885 |
| 587,509 | Roberts | Aug. 3, 1897 |
| 1,437,415 | Hauter | Dec. 5, 1922 |
| 1,792,601 | Oyster | Feb. 17, 1931 |
| 1,863,562 | Cannon | June 21, 1932 |
| 2,563,321 | Dugan | Aug. 7, 1951 |
| 2,619,218 | Krehbiel | Nov. 25, 1952 |

FOREIGN PATENTS

| | | |
|---|---|---|
| 629,844 | Germany | May 14, 1936 |
| 652,942 | Germany | Nov. 10, 1937 |